A. P. GRIFFIN.
CHAIN CONNECTION.
APPLICATION FILED APR. 21, 1922.
Reissued Sept. 5, 1922.
15,445.
2 SHEETS—SHEET 2.
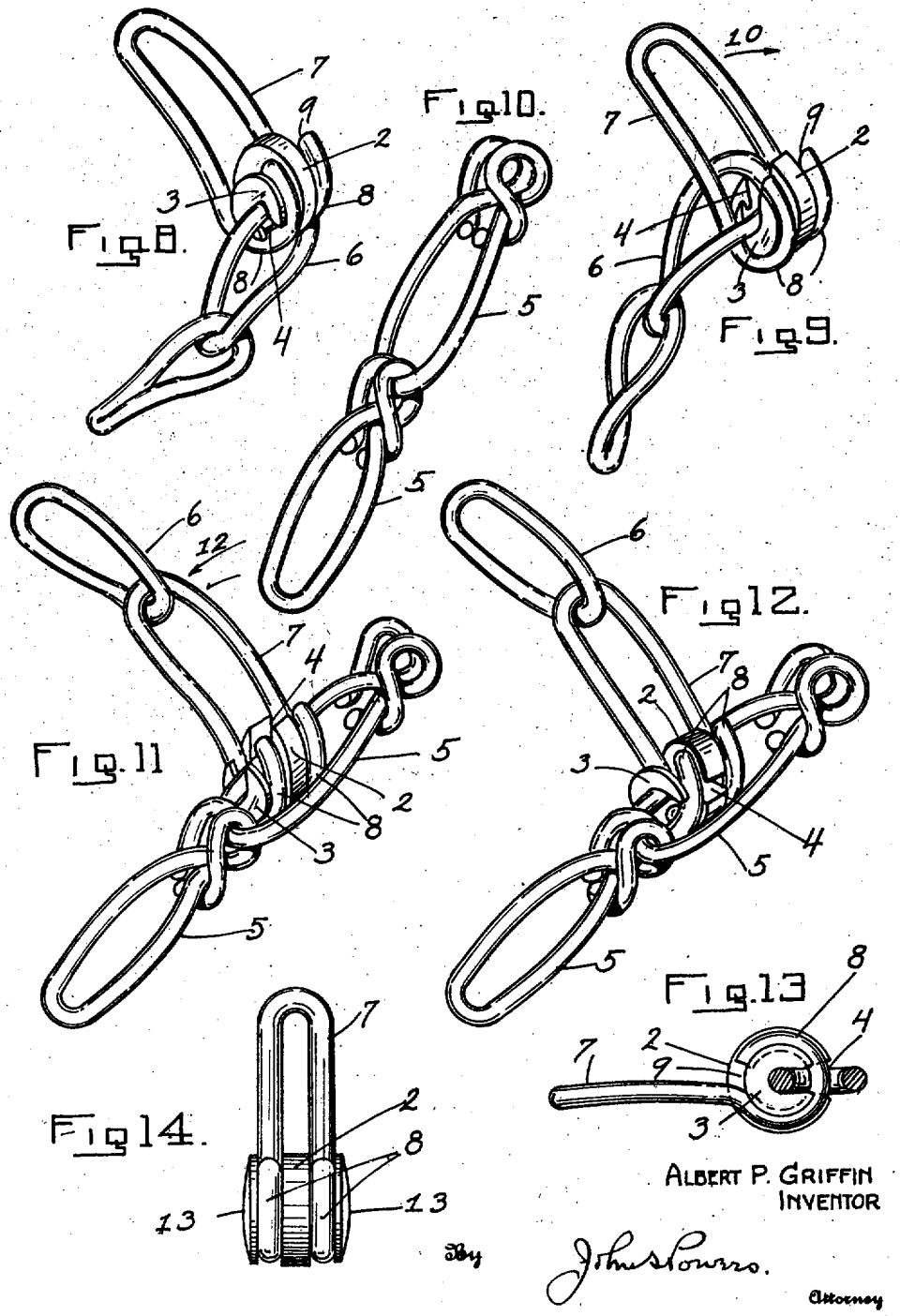
ALBERT P. GRIFFIN
INVENTOR
By John S. Lowrie.
Attorney A. P. GRIFFIN.
CHAIN CONNECTION.
APPLICATION FILED APR. 21, 1922.
Reissued Sept. 5, 1922. 15,445.
2 SHEETS—SHEET 1.
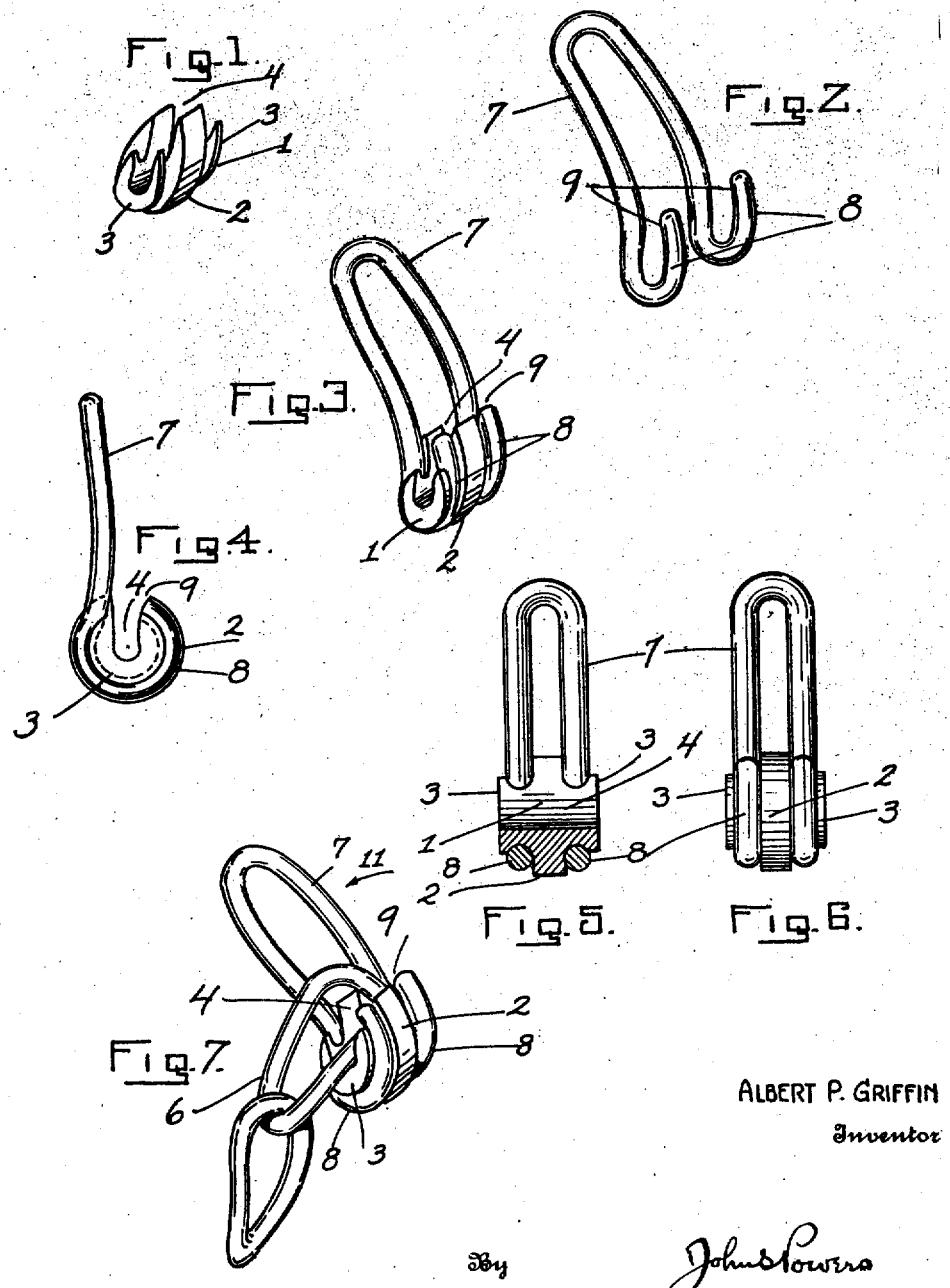
ALBERT P. GRIFFIN
Inventor
By John S. Powers
Attorney Reissued Sept. 5, 1922. Re. 15,445

UNITED STATES PATENT OFFICE.

ALBERT P. GRIFFIN, OF TROY, NEW YORK, ASSIGNOR OF ONE-HALF TO ARROW GRIP MANUFACTURING COMPANY, INC., OF GLENS FALLS, NEW YORK, A CORPORATION OF NEW YORK.

CHAIN CONNECTION.

Original No. 1,394,618, dated October 25, 1921, Serial No. 459,382, filed April 7, 1921. Application for reissue filed April 21, 1922. Serial No. 555,902.

*To all whom it may concern:*

Be it known that I, ALBERT P. GRIFFIN, a citizen of the United States, residing at Troy, in the county of Rensselaer and State of New York, have invented new and useful Improvements in Chain Connections, of which the following is a specification.

This invention relates to improvements in chain connections, proposing a device which is adapted for connecting together chain links of various kinds, but is particularly adapted for connecting the cross-chains with the longitudinal chains of a non-skid chain device.

The principal object of the invention is to provide a secure, yet readily separable, connection between a cross-chain and a longitudinal chain.

Other objects will appear in connection with the following description.

The invention consists generally in the combination of a link-receiving coupling part having terminal hook means and a guard concentrically mounted relatively to the hook means and having such form and relation that it may be readily manipulated and is available to thread a closed cross-chain link upon the coupling part and a closed longitudinal chain link within the terminal hook means, the guard being normally held by the longitudinal chain link in its operative position in which it closes the coupling part and secures the closed links.

An embodiment of the invention is illustrated in the accompanying drawings, it being understood, however, that the disclosed embodiment is merely of a form that is preferred, as now considered. In said drawings:

Figure 1 is a view in perspective of the guard of my improved chain connection.

Figure 2 is a view in perspective of a U-shaped coupling link adapted to be rotatively mounted upon the guard.

Figure 3 is a view in perspective showing the U-shaped link rotatively mounted upon the guard.

Figure 4 is a view in side elevation of the same.

Figure 5 is a cross-section of the same.

Figure 6 is a front view of the same.

Figure 7 is a view in perspective illustrating the manner in which a cross-link is placed in the U-shaped link in position for a hook-terminal of the U-shaped link to be threaded therethrough.

Figure 8 is a similar view showing one of the hook-terminals of the U-shaped link partly threaded through the closed link of the cross-chain.

Figure 9 is a similar view showing the closed link threaded upon the shank of the U-shaped link.

Figure 10 is a view in perspective of a section of a longitudinal chain.

Figure 11 is a view in perspective illustrating the manner in which the link of the longitudinal chain is seated in the slot in the guard and in the hook-terminals of the U-shaped link preparatory to threading the ends of the U-shaped link through the longitudinal link.

Figure 12 is a similar view showing the hook-terminals of the U-shaped link threaded through the link of the longitudinal chain.

Figure 13 is a view similar to Fig. 4, showing in cross-section a link of the longitudinal chain connected with a cross-chain.

Figure 14 is a view similar to Figure 6, illustrating a modified form of guard.

Referring to the drawings wherein the invention is shown in preferred form, 1 is a guard, preferably having a circumferential flange 2, and on opposite sides thereof a pair of trunnions 3—3 and formed with an open slot 4 extending along one side of said flange and through one and preferably both of the trunnions, which slot is of dimensions to freely receive either a link 5 of a longitudinal chain or a closed link 6 of a cross-chain.

A coupling link 7, preferably U-shaped, is adapted to be rotatively mounted upon the guard by means of hook-shaped terminals 8 on the U-shaped link, which terminals partly encircle the respective trunnions with the circumferential flange 2 of the guard between said terminals, the guard being movable through a full revolution.

The hook-shaped terminals 8 are formed with openings 9 of a width to freely receive either the link 5 or the link 6, but these terminals are made to encircle the respective trunnions more than one hundred eighty degrees whereby they are securely though rotatively mounted upon the trunnions.

I have shown in the drawings only a short section of the longitudinal chain and only a short section of a cross-chain.

The cross-chains are made of a number of closed links 6 terminating at each end in a U-shaped link 7 whereby the cross-chain is connected with a longitudinal chain.

By means of my improved connection the closed link portion of a cross-chain can readily be removed and replaced, replacement of the terminal U-shaped links being rarely required as they are not exposed to the same wearing action as the closed links of the cross-chain.

In removing a closed link 6 from the connection, the U-shaped link is moved into such a rotative position with respect to the guard that the openings 9 in its hook terminals register with the slot 4 in the guard, which position is shown in Figs. 3 and 4.

The closed link 6 which engages the U-shaped link is then moved along one of the members of the U-shaped link through the opening in the hook-terminal of that member, and into the slot in the guard as shown in Figure 9.

The U-shaped link is then rotatively moved in the direction of the arrow 10 relatively to the guard and link 6 causing said hook-terminal to be unthreaded from the closed link 6, thereby releasing the closed link, the releasing position being shown in Figure 7, and intermediate position being shown in Figure 8.

In applying a closed link 6 to the U-shaped link the operation is reversed, the closed link being inserted through the opening of a hook-terminal of the U-shaped link into the slot 4 in the guard in the position shown in Figure 7, and the U-shaped link is then rotatively moved in the direction of the arrow 11, relatively to the guard and link 6 causing the end of the hook-terminal to be threaded through the closed link until the parts reach the position shown in Figure 9, in which the closed link is threaded upon the body of the U-shaped link, Figure 8 showing the intermediate position as before.

In attaching the cross-chain to the longitudinal chain, the U-shaped link and guard are brought to the position shown in Figs. 3 and 4, and a link 5 of the longitudinal chain is inserted through the openings 9 in the hook-terminals of the U-shaped link into the slot 4 in the guard as shown in Figure 11.

By a relative rotative movement between the U-shaped link and the guard the direction of which is indicated by the arrow 12, with respect to the U-shaped link, the hook-terminals are threaded through the longitudinal chain link 5 until the parts assume the relative position shown in Figs. 12 and 13, in which position the cross-chain is secured to the longitudinal chain. A reversal of the operation just described serves to release the cross-chain from the longitudinal chain.

When the skid chain is in use on a tire the side chains lie flat at the sides of the tire and the cross chains are stretched across the tire with the result that the links 5 are effective securely to hold the guards 1 of the several coupling links in their operative positions in which they close said coupling links and secure thereon the adjacent closed links 5 and 6.

In Figure 14, I have shown the trunnions 3 formed with enlarged heads or flanges 13 whereby the hook-terminals of the U-shaped link are confined, and spreading of the link is prevented.

Having described my invention I claim:

1. A chain-connection comprising in combination a guard having a pair of trunnions on opposite sides of a circumferential flange, and provided with an open link-receiving slot along one side of said flange and trunnions; and a U-shaped link having terminals rotatively engaging the respective trunnions and severally provided with link-receiving openings adapted to register with said open slot in one rotative position of said U-shaped link relatively to said guard.

2. The combination with a cross-chain having a closed link, and a U-shaped link having open hook-terminals whereby it can be threaded through said closed link; of a guard having a circumferential flange extending between, and a pair of trunnions on opposite sides of said flange rotatively engaged by, said hook-terminals, said guard being provided with an open link-receiving slot along one side of said flange and trunnions adapted to register with the openings in said hook-terminals in one rotative position of said guard relatively to said U-shaped link.

3. The combination with a longitudinal chain; and a cross-chain having a closed link, and a U-shaped link having open hook-terminals whereby it can be threaded through said closed link, and through a link of said longitudinal chain; of a guard having a circumferential flange extending between, and a pair of trunnions on opposite sides of said flange rotatively engaged by, said hook-terminals, said guard being provided with an open slot along one side of said flange and trunnions adapted to register with the openings in said hook-terminals in one rotative position of said guard relatively to said U-shaped link, in which position either said closed link of the cross-chain, or said link of the longitudinal chain can be inserted through the openings in said hook-shaped terminals into said slot in the guard.

4. A chain-connection comprising in combination a guard having a pair of trunnions on opposite sides of a circumferential flange, and provided with an open link-receiving slot along one side of said flange and trunnions; and a U-shaped link saving terminals rotatively engaging the respective trunnions and severally provided with link-receiving openings adapted to register with said open slot in one rotative position of said U-shaped link relatively to said guard, said guard having hook-terminal-confining flanges on the outer ends of said trunnions.

5. A chain connector comprising a coupling link having terminal hook means and having its bight open at said means and a guard journalled in said hook means for movement through a full revolution; said guard having an open link receiving recess adapted in one position of said guard to permit a coupled link to be threaded upon a side bar of said coupling link as and for the purpose set forth.

6. A chain connector comprising a U-shaped coupling link having spaced terminal hooks and a guard journalled in said hooks for movement through a full revolution, said guard extending between said hooks and having an open link-receiving recess extending to at least one end thereof as and for the purpose set forth.

7. A chain connector comprising a U-shaped coupling link having spaced terminal hooks and a guard journalled in said hooks for movement through a full revolution, said guard extending between said hooks and having an open link-receiving recess from end to end thereof as and for the purpose set forth.

8. A chain connector comprising a link-receiving coupling part having terminal hook means and a bight open at said means and a guard mounted concentrically of said means and movable through a full revolution, said guard having an open link receiving recess adapted in one position of said guard to permit a coupled link to be threaded upon said part as and for the purpose set forth.

9. A chain connector comprising a coupling link having terminal hook means and having its bight open at said means and a guard journalled in said hook means and serving simultaneously to hold two links in engaged relation with said coupling link, said guard having an open link receiving recess extending to at least one end thereof and for the articulation of said several links being manipulated successively to two positions, in the first of which a coupled link engaged in said recess may be threaded upon a side bar of the coupling link and in the second of which another coupled link may be threaded over said hook means.

In testimony whereof, I affix my signature.

ALBERT P. GRIFFIN.